(No Model.)  6 Sheets—Sheet 1.
C. E. ONGLEY.
ELECTRIC SIGNAL AND PROTECTIVE SYSTEM.
No. 498,988. Patented June 6, 1893.
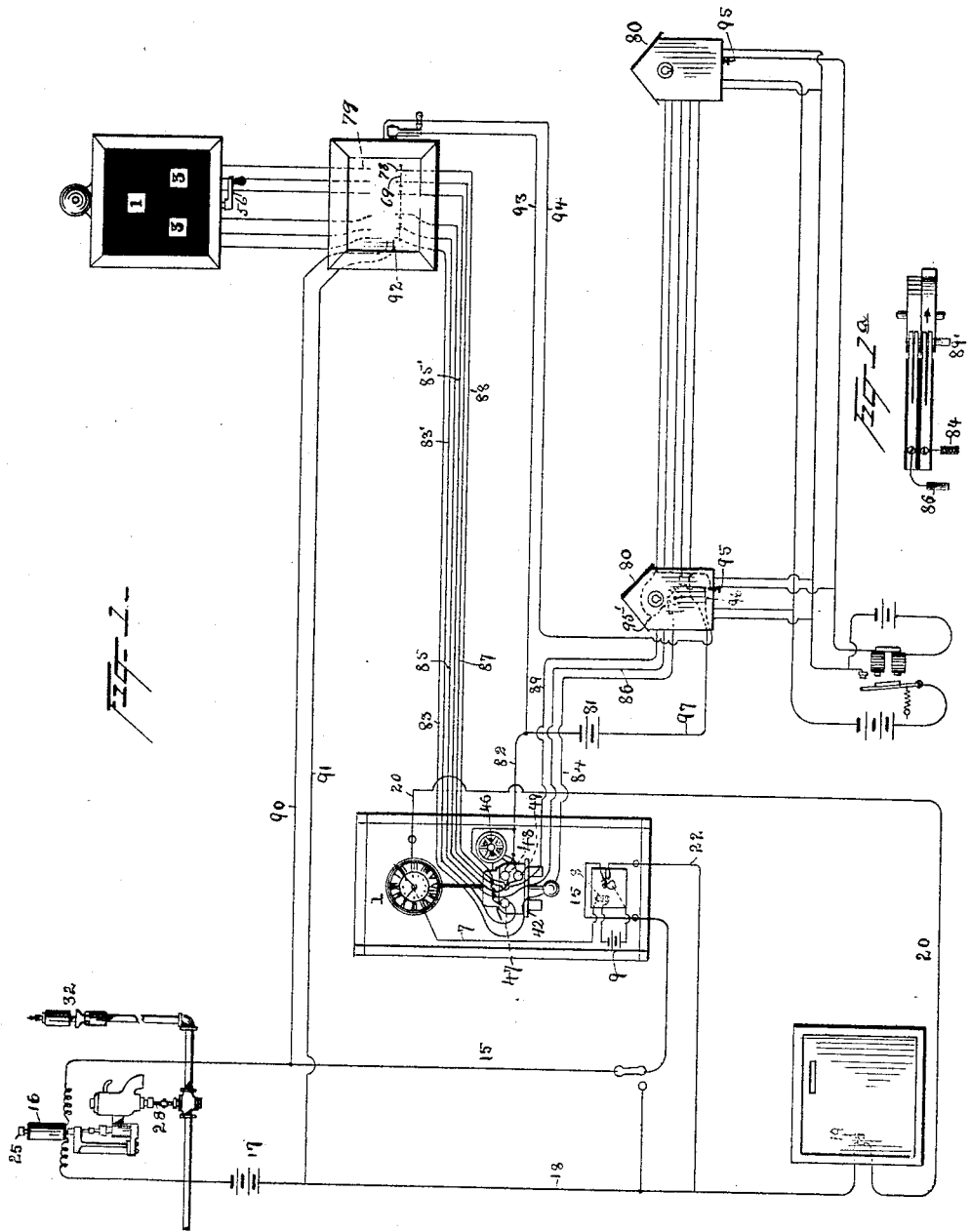
WITNESSES:
Edward C. Rowland
N. F. Oberly
INVENTOR
C. E. Ongley
BY Dyer & Seely
ATTORNEYS (No Model.)  6 Sheets—Sheet 2.
C. E. ONGLEY.
ELECTRIC SIGNAL AND PROTECTIVE SYSTEM.
No. 498,988.  Patented June 6, 1893.
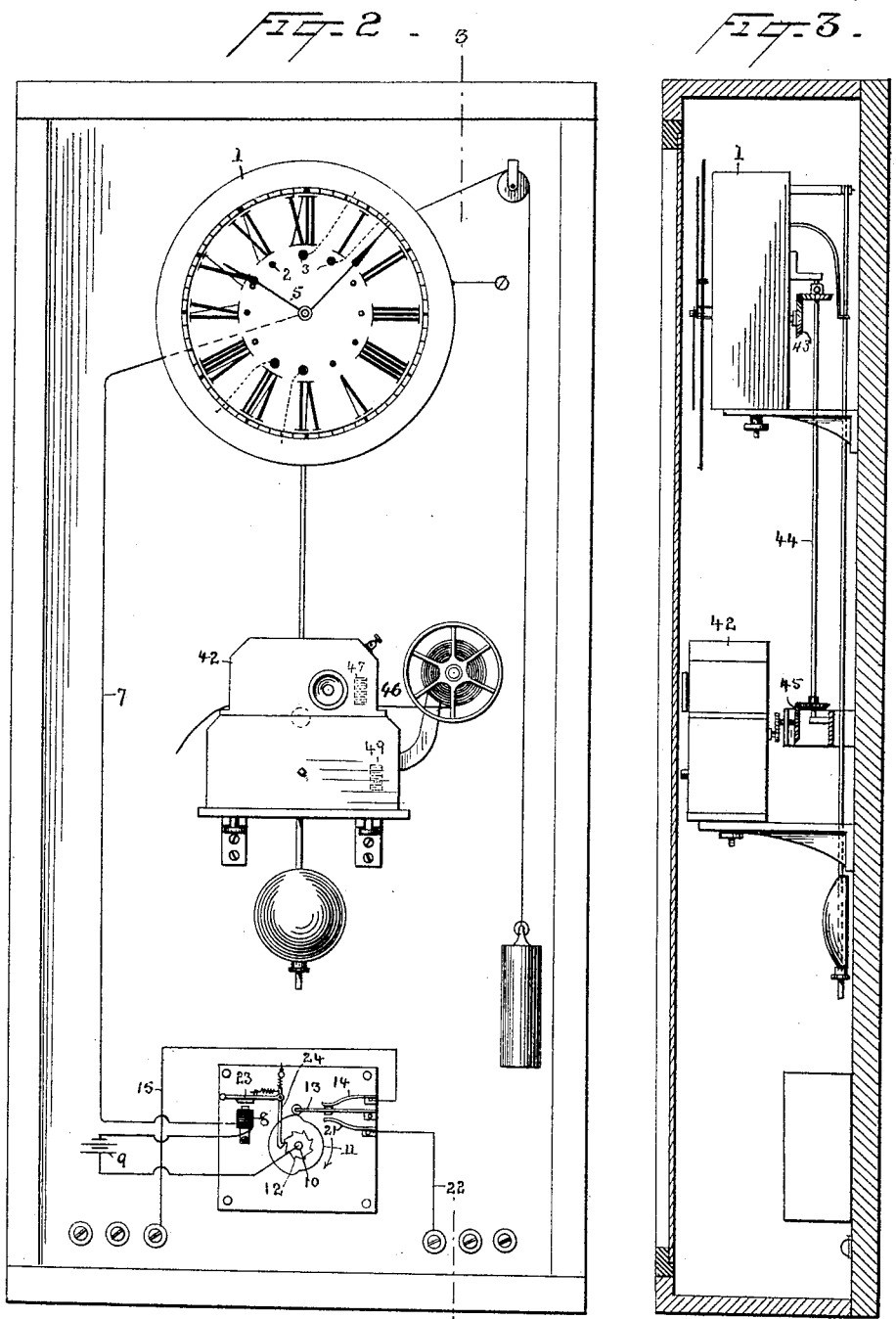
WITNESSES:
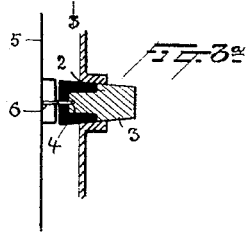
INVENTOR
C. E. Ongley
BY Dyer & Seely,
ATTORNEYS

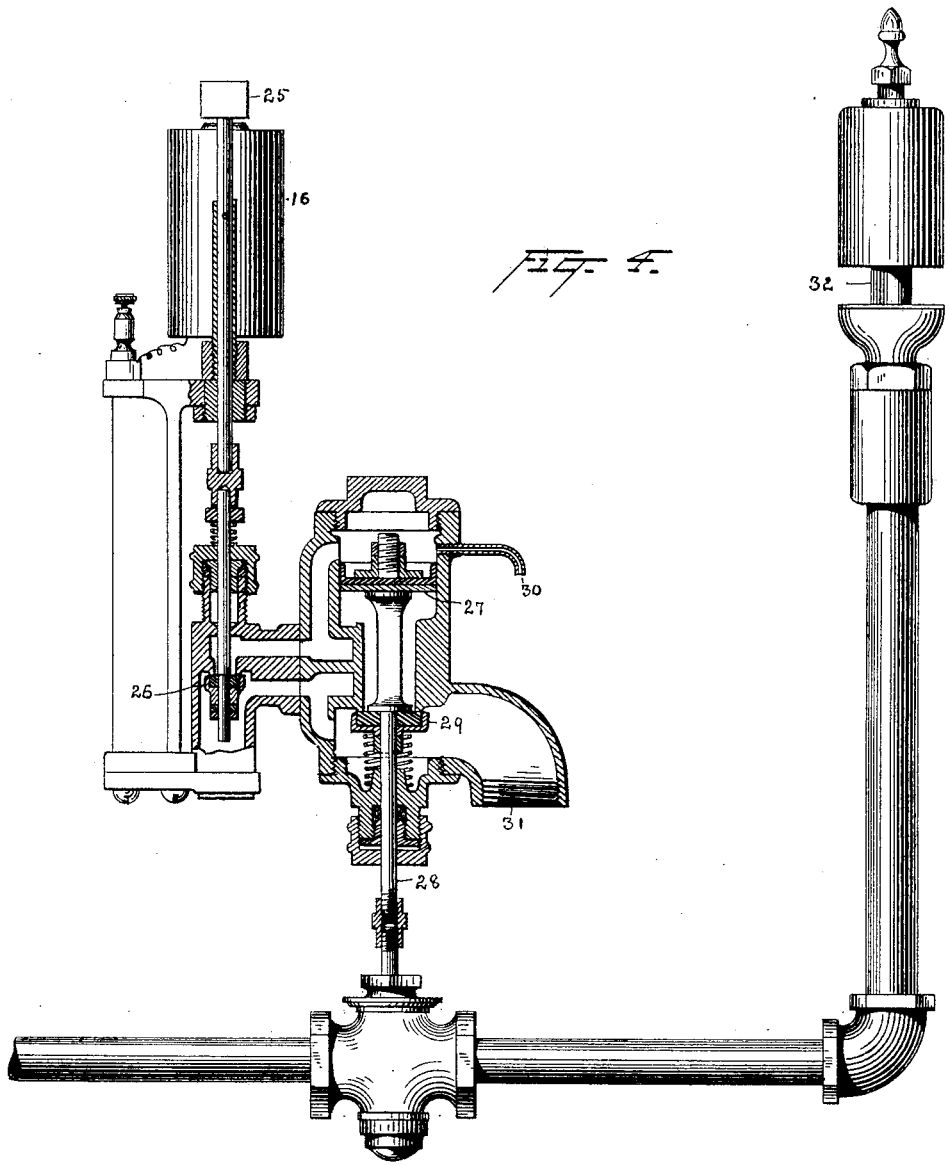

(No Model.) 6 Sheets—Sheet 4.
C. E. ONGLEY.
ELECTRIC SIGNAL AND PROTECTIVE SYSTEM.
No. 498,988. Patented June 6, 1893.
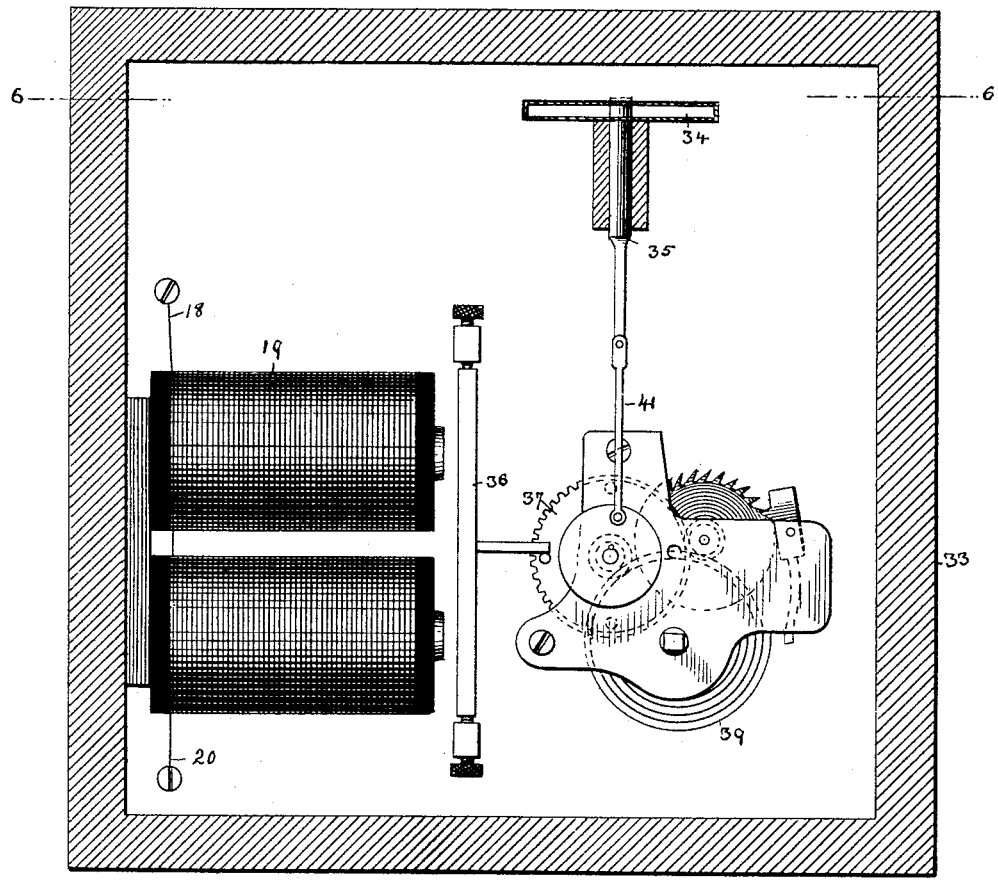
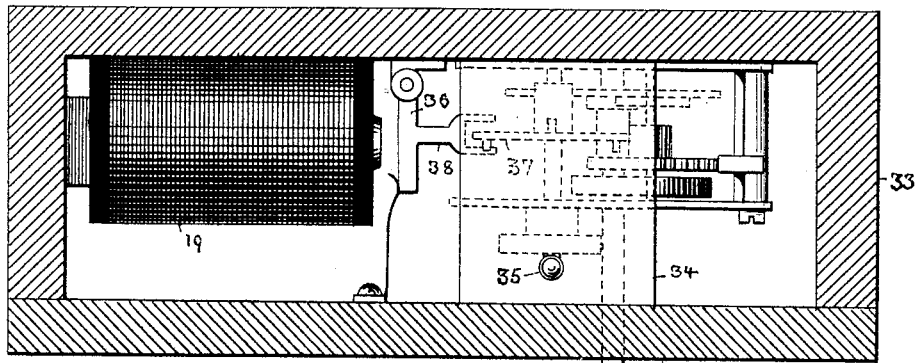
WITNESSES:
INVENTOR
BY C E Ongley
Dyer & Seely
ATTORNEYS.

(No Model.) 6 Sheets—Sheet 5.
C. E. ONGLEY.
ELECTRIC SIGNAL AND PROTECTIVE SYSTEM.
No. 498,988. Patented June 6, 1893.

WITNESSES:
Edward A. Rowland
N. F. Oberlin

INVENTOR
C. E. Ongley
BY Dyer & Seely
ATTORNEYS.

THE NORRIS PETERS CO., PHOTO-LITHO., WASHINGTON, D. C.

(No Model.)  6 Sheets—Sheet 6.

C. E. ONGLEY.
ELECTRIC SIGNAL AND PROTECTIVE SYSTEM.

No. 498,988.  Patented June 6, 1893.

WITNESSES:

INVENTOR
BY C E Ongley
Dyer & Seely
ATTORNEYS.

UNITED STATES PATENT OFFICE.

CHARLES E. ONGLEY, OF NEW YORK, N. Y., ASSIGNOR, BY DIRECT AND MESNE ASSIGNMENTS, TO THE ONGLEY ELECTRIC COMPANY, OF SAME PLACE.

ELECTRIC SIGNAL AND PROTECTIVE SYSTEM.

SPECIFICATION forming part of Letters Patent No. 498,988, dated June 6, 1893.

Application filed January 21, 1891. Renewed November 16, 1892. Serial No. 452,151. (No model.)

*To all whom it may concern:*

Be it known that I, CHARLES E. ONGLEY, a citizen of the United States, residing at New York, in the county and State of New York, have invented a certain new and useful Improvement in Electric Signal and Protective Systems, (Case L,) of which the following is a specification.

The object of the present invention is, to provide a system and apparatus for controlling several operations designed to convey information to, and to control the movements of, the workmen in a factory, and to control the fire alarm and signal circuits and instruments arranged in such factory or in other locations.

Figure 7:
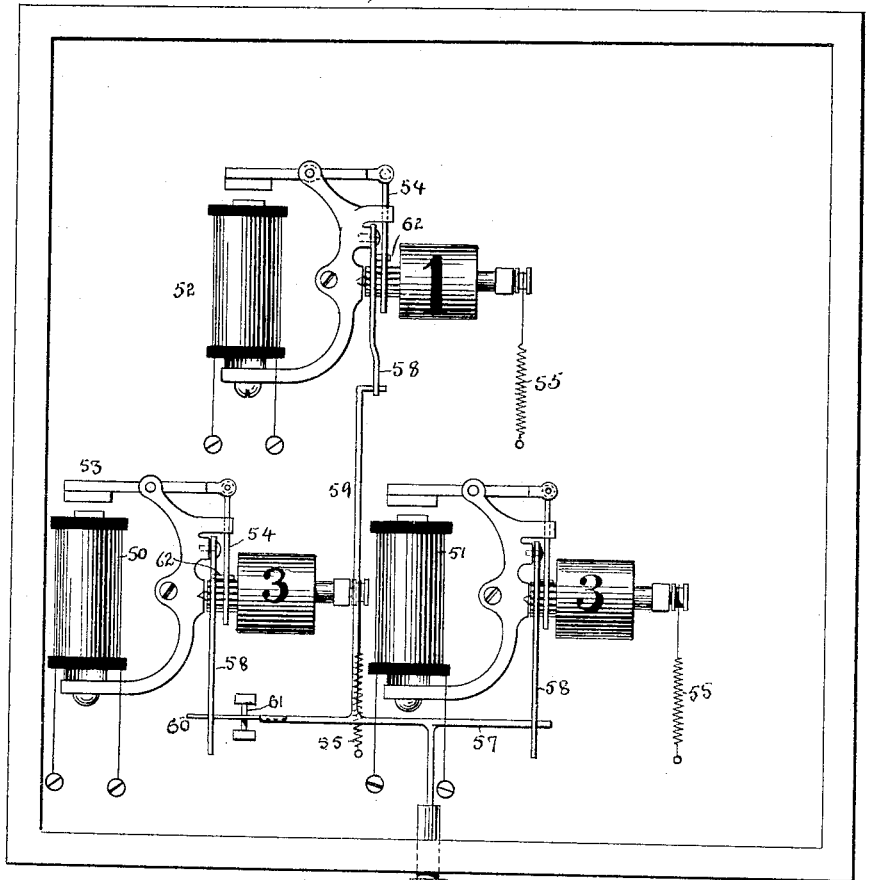
Figure 8:
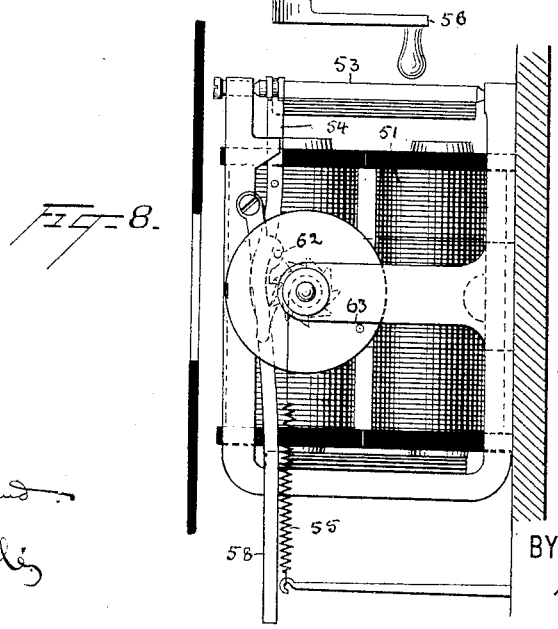
Figure 9:
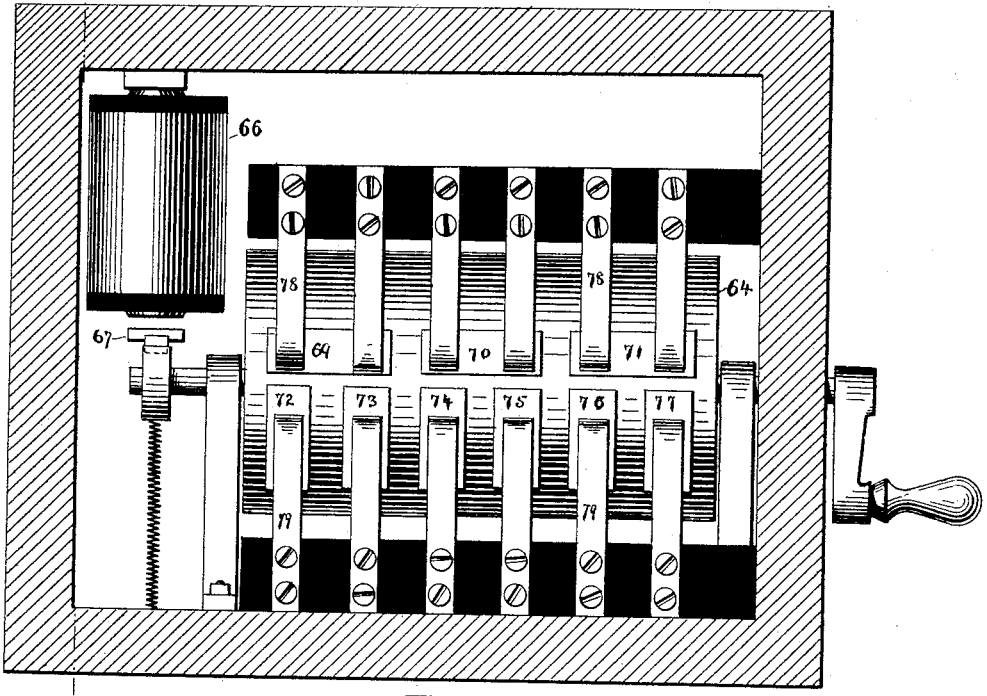
Figure 10:
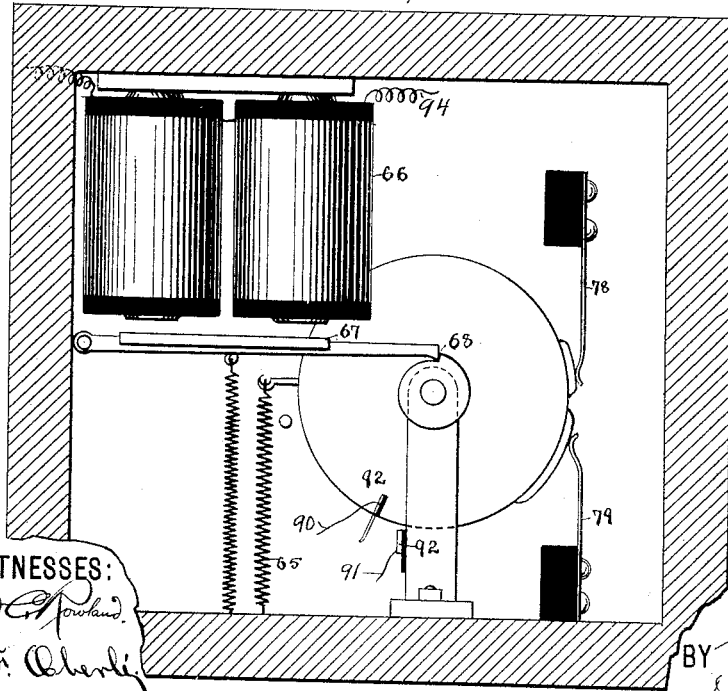

In the accompanying drawings, Figure 1 is a diagram showing the general arrangement of the several instruments combined in the system. Fig. 1ª is a detail view of a portion of a transmitter. Fig. 2 is a face view of a timepiece which makes and breaks a circuit and also operates the time printing type wheels of a recorder. Fig. 3 is a view of said time-piece on line 3 3 of Fig. 2. Fig. 3ª is a detail of the circuit controller. Fig. 4 is a view of a steam whistle and mechanism for operating it. Fig. 5 is a vertical section of a case or box for the reception of workmen's checks. Fig. 6 is a sectional view of the same device on line 6 6 of Fig. 5. Fig. 7 is a front view of a signal receiver, the front plate being removed to show the internal construction. Fig. 8 is a view of a portion of the receiver at right angles to Fig. 7. Fig. 9 is a view of an automatic switch for controlling the circuits of said receiver; and Fig. 10 is a view at right angles thereto.

It is customary in factories to blow the whistle, or to sound some other alarm, four times a day, for example, at seven in the morning, noon, one o'clock and six o'clock, to notify workmen when to enter or leave the factory. Workmen are required to deposit checks on entering a building to show that they are present at the proper time. In the present system the whistle is sounded automatically at the desired hours, and the opening into which the checks are to be introduced is automatically closed so that a check cannot be deposited if the workman is late.

1 is a clock or time mechanism, preferably an eight-day clock. At intervals around the face of the clock are holes 2, adapted to receive plugs 3, which constitute one terminal of a circuit. In the outer end of the plug is a small pin 4 of platinum.

5 is the hour-hand and carries a corresponding pin 6 in line with pin 4, so that when the hand passes a plug the circuit hereafter traced is closed for a short time. To the arbor of the clock is connected a wire 7, which passes through magnet 8, battery 9, to the axis 10, which carries a cam 11 and a propelling ratchet wheel 12. On the surface of the cam rests a conducting arm 13, which, when the raised portion of the cam is under said lever, is in contact with spring 14, which by wire 15 is connected to the magnet 16, battery 17, wire 18, to magnet 19, wire 20, to the plug or plugs inserted in the holes of the clock face. When the lower part of the cam is under the arm 13, said arm falls against the spring 21, which is connected by wire 22 to wire 18 and completes a short circuit to magnet 16. Magnet 8 above referred to has an armature 23, which carries a propelling pawl 24 for the cam. The magnet 16 has an armature 25, which controls the valve 26.

27 is a piston connected by a suitable rod 28 to the steam valve or other controlling apparatus of the whistle or alarm. On the rod 28 is a second valve 29, and above the piston 27 is an open exhaust 30.

31 is a pipe leading to a supply of steam or water for pushing down the piston 27 when admitted through the valve 26. The valve 29 is normally closed by the water standing under it, and by the spring which is shown below the valve. When the small valve 26 is opened admitting water above the piston the latter is moved down admitting steam to the whistle by means of the rod 28; at the same time water is admitted below the piston 27 by the opening of the valve 29. This puts the piston in a balanced condition there being water pressure on both sides of the piston head, but as soon as valve 26 is closed the tension of the spring closes valve 29 owing to the escape of water at the exhaust 30 relieving the pressure on the upper side of the piston. With this arrangement the movement of the piston and of the valve 29 in either direction is gradual and a light spring can be used to close said valve.

32 is the whistle or alarm.

In Fig. 5, 33 is a box or case having an opening or slit communicating with a passage 34 into which workmen's checks are to be dropped. This passage, at the time when workmen are expected to enter the building is open, the rod 35 being then withdrawn, but when it is too late for the workmen to enter the building the circuit of magnet 19 is automatically closed by the clock, the armature 36 is attracted, releasing wheel 37, allowing it to make a one-half revolution, bringing pin 35 to the position shown in Fig. 5. It will be seen that the wheel 37 carries four pins, two arranged diametrically on one side, and two on the opposite side on a diameter at right angles to the first diameter, and the armature 36 carries an arm 38 having two prongs, one of which engages with the pins on one side of the wheel, and the other of which engages with the pins on the opposite side.

39 is a spring or motor for turning the wheels 37 and 40, to the latter of which the rod 35 is connected by means of a wrist-pin and connecting rod 41.

Below the clock (see Figs. 1, 2 and 3) is a recorder or register 42, which may be constructed as set forth in my patent, No. 443,787, dated December 30, 1890, or as set forth in my application, Serial No. 378,909, dated January 24, 1891. In said recorders two type wheels, called time printing type wheels, are moved along at regular intervals by a clock, and other type wheels are moved along step by step by magnets to place them in proper position to print any desired information. By this arrangement the time at which the recorder is operated is printed simultaneously with the box number or other information. It is not considered necessary to show this mechanism in detail in the present application. At the rear of the clock is a beveled gear 43, which, by means of shaft 44 and gear 45, advances the time printing type wheels of the recorder.

46 is the paper tape on which the record is printed.

In the recorder used in this system, and in the recorders above referred to, there are three magnets, two for operating two type wheels, and one for operating the printing platen. These magnets are indicated at 47, 48, 49 in Fig. 1, and at 47, 49 in Fig. 2, for the purpose of enabling the circuits of the system to be described.

The signal receiver shown in Figs. 7 and 8 is composed of any suitable number of magnets, each of which operates a separate roll or similar device on which numbers or other information is printed. Three such magnets are shown in the present case and are lettered 50, 51, 52. Each magnet has an armature 53, which operates a pawl 54, which turns the signal rolls in the proper direction against the force of retracting springs 55 or equivalent motors or devices such as weights. The two lower rolls indicate the box or station number, and the upper roll the information conveyed, for example, 1 may indicate fire. In this system the upper roll might be dispensed with since it is designed to use the receiver only in case of fire.

56 is a handle, to which is rigidly secured a cross-arm 57, one end of which rests behind the arm 58, the opposite end of which carries an arm 59 resting behind a second arm 58. This end of the arm is also in position to tilt the lever 60 on its pivot 61, and thus raise the third arm 58. The arms 58 are provided with pins 62, resting under the arms 54 which engage with the ratchet teeth to propel the rolls. When, therefore, these arms are raised by turning the handle 56, the springs 55 immediately draw all the rolls back to their normal position, at which point they are stopped by pins 63, which are arranged to strike a fixed part of the apparatus.

The automatic switch shown in Figs. 9 and 10 consists of an insulating cylinder 64 adapted to be turned through a short arc by means of the spring 65 when the magnet 66 attracts its armature 67 and releases the detent 68. On the surface of the cylinder are contact plates 69, 70, 71 arranged lengthwise of the cylinder, and 72, 73, 74, 75, 76, 77 arranged at right angles thereto. On the first series of contacts, when the switch is in the position shown, the springs 78 bear, and on the second series of contacts the springs 79 bear. When the switch is turned the contacts 72 &c., are moved forward so as to rest under both series of springs 78, 79.

In Fig. 1 two transmitters or signal boxes 80 are shown. These are constructed in any suitable manner, but it is considered unnecessary to show the same in full. The transmitters should, however, have a circuit making and breaking device which will send a series of impulses first over one wire and then over a second wire to advance the signal type wheels, and then to send an impulse over a third wire to operate the printing platen. Such means are shown in Fig. 1ª. The two circuit making wheels turn in the direction indicated by the arrow. The lower wheel makes and breaks line 84; then the upper wheel makes and breaks line 86, and finally pin 89′ strikes a spring closing circuit 89.

Below the signal boxes is shown an arrangement of circuits, which however is not claimed in this application, for preventing interference between signals from different boxes.

81 is a battery, which serves to operate the signal type wheels and printing platen of the recorder, the magnets of the signal receiver and the magnet of the automatic switch. From one pole of the battery a wire 82 extends to the recorder, where it divides into three branches, one extending through the magnet 47, thence by a loop 83′ to the automatic switch, through a plate 69, to the return wire of the loop 83, then by wire 84 to the transmitter and to the circuit making spring or device which closes the first circuit. The second branch passes through magnet 48, loop wire 85′ to second plate 70 of the automatic switch and return wire of the loop 85, thence by wire 86 to the transmitter and to the spring which makes and breaks the second circuit. The third branch passes through magnet 49, thence by loop wire 88 to the third plate 71 of the automatic switch, thence by the return wire of the loop 87 to wire 89 to the transmitter and to the contact which makes and breaks the third circuit. With this arrangement the signal receiver above the automatic switch is cut out of circuit.

From the wires 15, 18 extend branch wires 90, 91 and terminate in normally separated contacts 92 at the automatic switch. From the magnet 66 of said switch extends a wire 93 to the battery 81, and a wire 94 extends to a normally open fire alarm circuit closer having two terminals 95, 96 at each signal box. The contact 95 of this circuit closer is connected to a spring 95′.

The operation of the system is as follows: At seven o'clock in the morning the hour-hand will strike a pin 4, closing the following circuit: Wire 20, magnet 19, wire 18, battery 17, magnet 16, wire 15, arm 13, cam 11, battery 9, magnet 8, wire 7, back to the hour-hand of the clock. This energizes three magnets; the first, 19, attracts its armature, allowing wheel 40 to turn sufficiently to insert the rod 35 through the passage 34, so that said passage is obstructed and workmen cannot deposit checks until it is again withdrawn. The magnet 16 attracts its armature, opening the valve 26, allowing fluid to pass above piston 27, moving said piston down and admitting steam to the whistle. The third magnet 8 attracts its armature 23. When the circuit is broken by the hand passing from the pin, the valve automatically closes, and the armature 23 is retracted, turning the cam forward one space; the armature of magnet 19 is also pressed back to its original position. At twelve o'clock the wheel 40 will be again moved, opening the passage 34, the whistle will be again sounded and the cam will be advanced another step. At one o'clock the passage 34 will be closed, the whistle will be sounded and the cam advanced a third step. At six o'clock the operations will be repeated, but the cam will be moved so far that its raised half is carried away from the arm 13 allowing it to fall against the lower portion of the cam and into contact with spring 21. This closes the following circuit: Wire 22, arm 13, cam 11, battery 9, magnet 8, wire 7, wire 20 (when the hour-hand is on a contact point) magnet 19, back to wire 22. This circuit cuts out the magnet 16 and battery 17, so that the whistle will not be sounded during the night; it however includes the magnet 19 and battery 9, so that the cam will be moved forward and the rod 35 will be withdrawn at the proper time in the morning. It will be evident that during the night the cam 11 will be turned half way around as above described, so that just before seven in the morning the arm 13 will be raised to the position shown in Fig. 2. If at any time it is desired to sound the whistle out of the regular time, it may be done by a hand switch in wire 15.

There is a third way in which the whistle may be sounded, and that is by the operation of signaling a fire. Such signal is sent by closing the circuit at 95, 96 and operating a transmitter. The transmitter is turned until a part of the circuit controlling mechanism touches 95′. This closes the following circuit: From battery 81, to wire 93, magnet 66, wire 94 to the circuit closer 95, 96, to spring 95′, to wire 97, back to the battery. This releases the automatic switch as already described, throwing the signal receiver into circuit, and at the same time connecting wires 90, 91 completing the circuit through battery 17 and magnet 16. The whistle will continue to blow until the switch is reset or until the circuit is otherwise broken. It will be clear that when the switch is released and turns it will connect the six wires below the switch to the six wires above the switch by plates 72, 73 &c., and the magnets 47, 48, 49 of the recorder will be directly in series with the magnets 50, 51, 52 respectively of the signal receiver, so that as the transmitter revolves to send in a fire alarm signal, the signal is printed at the recorder, which is preferably in the office of the factory, and the signal is also indicated at the signal receiver, which may be in any desired position, such as the manager's house or at a fire department station.

Evidently the apparatus described may be used in hotels and other buildings as well as in factories, and a system need not be confined to one building.

Having thus described the invention, what I claim is—

1. The combination of an alarm, such as a steam whistle, a magnet for sounding the alarm, a circuit for the magnet, a time mechanism, a circuit controller operated at intervals thereby to energize said magnet, and a second controller controlled by a time mechanism which cuts out the alarm during a portion of each twenty-four hours, substantially as described.

2. The combination of an alarm, a magnet for sounding it, a circuit for the magnet, a circuit controller operated at intervals by time mechanism, a second circuit controller consisting of a cam or a similar device with segments, one of which holds the circuit in an operative condition, and the other of which cuts out the alarm, said cam or device being controlled by a time mechanism substantially as described.

3. The combination of an alarm, a magnet for sounding it, a circuit for the magnet containing two batteries, a circuit controller operated at intervals by time mechanism, and a second circuit controller in the same circuit, said second circuit controller cutting out the alarm magnet and one of the batteries, and being controlled by a time mechanism substantially as described.

4. The combination of a time mechanism, a whistle or other alarm, a circuit extending from said alarm to said time mechanism for operating the alarm at predetermined hours, and a check box, the opening of which is controlled in unison with the alarm, by the time mechanism substantially as described.

5. The combination of a time mechanism, a whistle or other alarm, a circuit extending from said alarm to said time mechanism for operating the alarm at predetermined hours, and a check box, the opening of which is controlled in unison with the alarm by a magnet in the same circuit, substantially as described.

6. The combination with an alarm, a magnet for causing it to operate, a check box, the opening of which is alternately opened and closed as said alarm is operated, by means of a device controlled by a magnet in the alarm circuit substantially as described.

7. The combination in a check receiving receptacle, of a passage into which the checks are to be dropped, a device for closing the passage, and a magnet for controlling the insertion or withdrawal of said device and a circuit controller in circuit with said magnet and operated by the time mechanism, substantially as described.

8. The combination in a check receiving receptacle, of a passage into which the checks are to be dropped, a device for closing the passage, and a magnet for controlling the insertion or withdrawal of said device, said magnet being in circuit with a circuit controller operated by time mechanism, substantially as described.

9. The combination in a check receptacle, of a passage into which the checks are to be dropped, a device for closing said passage, and means for inserting or withdrawing said device, consisting of a normally wound motor and a magnetic detent, substantially as described.

10. The combination, in a check receptacle, of a passage into which the checks are to be dropped, a device for closing said passage and means for inserting or withdrawing said device consisting of a motor, a wheel of which is connected to said device by a connecting rod, and a detent magnet and armature for said motor, substantially as described.

11. The combination, in a check receptacle, of a passage into which the checks are to be dropped, a device for closing said passage, and means for inserting or withdrawing said device consisting of a motor, a wheel of which is connected to said device by a connecting rod, a detent magnet and armature which release said motor, and a means to stop said motor when it is moved a certain distance, substantially as described.

12. The combination of an alarm, means for operating it, a piston for bringing said means into operation, a valve for admitting fluid to one side of said piston, a magnet for moving the valve, and a valve admitting fluid to the opposite side of the piston to balance it substantially as described.

13. The combination of an alarm, means for operating it, a piston for bringing said means into operation, a valve for admitting fluid to one side of said piston, a magnet in a circuit closed at certain times by a circuit closer operated by time mechanism and a valve admitting fluid to the opposite side of the piston to balance it, substantially as described.

14. The combination, in a signal receiver, of several devices bearing signal characters, propelling mechanism, one for each device, detent to prevent return movement of the signal device, a motor for retracting said devices, and means operated by one movement for releasing all said detent to allow the signal devices to return to their original positions, substantially as described.

15. The combination of a recorder normally in circuit with a transmitter, a signal receiver normally cut out of said circuit, and a switch released by closure of a circuit extending to said transmitter to throw the receiver into circuit, whereby certain alarms are received at the recorder and also at the receiver, substantially as described.

16. The combination of an alarm having a controlling or operating magnet, a signal receiver, a switch, a magnet in a fire alarm circuit for controlling the switch, and a circuit controller in the circuit of the alarm magnet operated by said switch, substantially as described.

This specification signed and witnessed this 13th day of January, 1891.

CHARLES E. ONGLEY.

Witnesses:
CHARLES M. CATLIN,
J. A. YOUNG.